United States Patent Office 2,891,909
Patented June 23, 1959

2,891,909

METHOD OF INHIBITING CORROSION OF METALS

William B. Hughes, Tulsa, Okla., assignor to Cities Service Research and Development Company, New York, N.Y., a corporation of New Jersey No Drawing. Application November 16, 1955
Serial No. 547,343

8 Claims. (Cl. 252—8.55)

This invention relates to inhibiting corrosion of metals, and is more particularly directed to improved compositions and processes for minimizing the corrosive effect of oil brine mixtures on oil field production and transmission equipment.

It is generally recognized that oil-producing formations often yield with the crude oil a brine which is extremely corrosive in its action upon the oil-producing and collecting equipment, including the metal tubing, casings, pumps, pipe lines, and storage equipment. This type of corrosion is particularly noticeable in wells producing brine which contain varying amounts of hydrogen sulfide, carbon dioxide, and other acidic materials.

Considerable effort has been directed in the past to reducing the cost of maintaining production and collection equipment free of corrosion by introducing into the well various neutralizer solutions such as caustic soda or other alkaline solutions. Other water-soluble corrosion inhibitors have also been used such as formaldehyde, nitrogen bases of various types, amines, and combinations of the foregoing compounds. Experience has shown that while some of these corrosion inhibitors are satisfactory at certain locations when used in wells which produce little water as compared to the oil produced, their cost becomes prohibitive when used in wells producing large amounts of water, since substantially the same concentration of the inhibitor must be maintained in the water phase in both types of wells in order to prevent corrosion.

It is accordingly an object of this invention to provide improved corrosion inhibiting compounds having structures which make them uniquely effective in minimizing and reducing corrosion in wells producing oil-brine mixtures, and particularly reducing corrosion in wells in which large amounts of brine are produced as compared to oil.

I have discovered that certain phosphate salts obtained by converting phosphoric acid to a partial ester and thereafter neutralized with amines provide most effective corrosion inhibiting. The phosphoric salts of my invention found to be unexpectedly effective in reducing corrosion are prepared by first reacting one mol of the amine compound with one mol of the phosphoric acid partial ester. I have found in particular that the 1,3 diamine salts of alkyl acid phosphates are particularly effective as corrosion inhibitors. Phosphate salts prepared by reacting two mols of the alkyl acid phosphate with the 1,3 diamines are particularly effective.

The chemistry involved in the production of the phosphate salts used in my invention is straight forward and can be represented as follows:

(a)  $H_3PO_4 + ROH \longrightarrow R-H_2PO_4 + H_2O$
(b)  $R-H_2PO_4 + R^1NH_2 \longrightarrow RNH_3HPO_4$
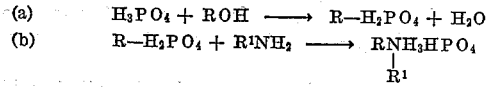

The product of reaction "b" is capable of accepting an additional basic molecule by addition to the remaining hydrogen so that if desired a dibasic amine can be added or two separate amines can be added.

Among the amines which I have found provide particularly effective neutralizers of the phosphate partial esters, the following are typical:

Duomeen 12
Duomeen C
Duomeen S
Duomeen T

These amines are the commercially available products prepared by the Armour Chemical Division. The nature of the Duomeens which are primarily fatty diamines will be more clearly understood from Table 1 which follows:

TABLE 1

| Duomeen | Parent Fatty Acid | Theoretical Mol Wt. | Combining Wt. |
|---|---|---|---|
| 12 | Lauryl | 242 | 303 |
| C | Coconut | 257 | 312 |
| S | Soya | 321 | 402 |
| T | Tallow | 320 | 400 |

In order to more clearly understand the method of preparing the phosphate salts utilized in this investigation, the following examples are provided, it being understood that the exact conditions given in the examples are not in any way critical.

*Example 1*

To 400 grams (1.0 mol.) of Duomeen T 460 grams (2.0 mls.) of n-octyl acid phosphate were added with agitation. The mixture generated spontaneous heat during the neutralization process. The resulting product was a brown material, semi-solid at room temperature and completely soluble in oil.

*Example 2*

To 400 grams (1.0 mol) of Duomeen T 376 grams (2.0 mol) of amyl acid phosphate were added with mixing. After the removal of heat spontaneously generated during the neutralization process, the phosphate salt product was cooled, washed and tested as a corrosion inhibitor providing the results shown in Table 2 which follows. The product of this example is represented in Table 2 as "Corrosion Inhibitor No. 2."

*Example 3*

To 376 grams (2.0 mols) of amyl acid phosphate 312 grams (1.0 mol) of Duomeen C was added with gentle agitation with spontaneous heat being generated during the neutralization of the amyl acid phosphate. The product obtained was a semi-solid material at room temperature having a brownish color and being completely soluble in oil. The product was tested as a corrosion inhibitor, as shown in Table 2, and is identified as "Corrosion Inhibitor No. 7."

*Example 4*

To 402 grams (1.0 mol) of Duomeen S 460 grams (2.0 mol) of normal amyl acid phosphate were added with mixing. The mixture generated heat spontaneously during the neutralization process. The resulting product was a brown semi-solid at room temperature and was completely soluble in oil. This product was tested as a corrosion inhibitor and is identified as "Corrosion Inhibitor No. 8" in Table 2 which follows.

*Example 5*

Following the procedure outlined in the previous examples 320 grams (2.0 mols) of butyl acid phosphate was added to 303 grams (1 mol) of Duomeen 12 with mixing. The mixture generated spontaneous heat. The product obtained is identified as "Inhibitor No. 10" recorded in Table 2 which follows.

The effectiveness of my compositions in reducing the corrosiveness of oil field brine may be more fully understood by reference to certain tests which I have conducted, using prepared brines to substantially duplicate well conditions. The test procedure involved a measurement of the corrosion action of a hypothetical well fluid as inhibited with compositions described above upon weighed, cleaned, and polished strips of number 18 gauge cold rolled steel measuring one-quarter inch by four inches, under conditions closely approximating those existing in a producing well and a comparison thereof with the results obtained by subjecting identical strips to the corrosive action of my hypothetical well fluid without inhibitor added.

The test includes the use of a number of bottles or flasks sufficient to provide one for the testing of corrosion inhibitors in varying amounts, and one for comparison for each of the corrosion inhibitors being tested. To cleaned and numbered one liter Erlemeyer flasks, 600 ml. of a 5 weight percent aqueous sodium chloride solution and 400 ml. of depolarized kerosene were added. A stopper provided with gas inlet and outlet ports was inserted in the flask, and natural gas or nitrogen was blown through the brine solution for about one hour to purge any oxygen present. After the purging was completed, the corrosive inhibitor beting tested was added to each flask in amounts ranging from 10 to 50 p.p.m., based on the quantity of brine present in the flask. The weighed and cleaned test strips were then attached to the end of a glass rod in such a manner that two pieces of plastic laboratory tubing prevented contact between the strip and the glass, while a third piece of tubing held the strip firmly in position. The glass rod was then inserted through the rubber stopper in such a manner that one-half of the test strip was in contact with the kerosene, and the other half in contact with the aqueous layer. At all times precautions were maintained to exclude air from the bottles by frequent and liberal purging with the natural gas or nitrogen.

After addition of the inhibitor was completed, hydrogen sulfide gas was bubbled through the liquid until the liquid was saturated with the gas. The flask was then sealed and allowed to stand for 48 hours. The steel strip was then removed, washed in kerosene and then methanol, and finally washed with water prior to acid cleaning. The acid cleaning consisted of treating the test strip in a one weight per cent hydrochloric acid solution for a few seconds, washing with water, and thoroughly wiping with cheesecloth. The acid treatment was repeated several times until the original luster of the test strip was obtained as nearly as possible with a minimum amount of acid treating. After acid treating was completed, the strips were again washed in methanol, followed by acetone, and were then reweighed to determine the weight loss. Blank runs were used for each inhibitor to provide the comparison basis.

The changes in weight of the test strips during the corrosion test were taken as a measure of the effectiveness of the inhibitor compositions; thus a protection percent may be caluculated for each of the test strips taken from the inhibited test fluids in accordance with the following formula:

$$\frac{L1-L2}{L1} \times 100$$

in which L1 is the loss in weight of strips taken from uninhibited test fluids, and L2 is the loss in weight of strips which were subjected to inhibited test fluids.

The results of tests carried out with the phosphate salts of my invention are summarized in the table below. Under "Percent Protection," two columns are provided for respective test results obtained when utilizing 25 and 10 p.p.m. specific when using the phosphate compounds.

TABLE 2

| Inhibitor No. | Duomeen | Phosphate | Mol Ratio | Percent Protection | |
|---|---|---|---|---|---|
| | | | | 25 p.p.m. | 10 p.p.m. |
| 1 | T | Octyl | 1:2 | 92.6 | 59.5 |
| 2 | T | Amyl | 1:2 | 98.3 | 87.4 |
| 3 | T | Isopropyl | 1:2 | 99.8 | 65.7 |
| 4 | T | Octyl | 1:1 | 87.6 | 40.1 |
| 5 | T | Amyl | 1:1 | 90.6 | 72.8 |
| 6 | T | Isopropyl | 1:1 | 85.9 | 51.0 |
| 7 | C | Amyl | 1:2 | 98.6 | 95.3 |
| 8 | S | Amyl | 1:2 | 84.4 | 56.4 |
| 9 | 12 | Amyl | 1:2 | 99.9 | 92.2 |
| 10 | 12 | Butyl | 1:2 | 99.7 | 90.8 |
| 11 | 12 | Lauryl | 1:2 | 91.8 | 63.1 |
| 12 | 12 | Dimethyl | 1:2 | 81.4 | 32.8 |

It will be evident from the foregoing table that corrosion may be effectively reduced to a value of one-tenth or less of that due to the natural flow of well fluids through the well tubing pipe lines by incorporating in the well fluid comparatively small quantities of the phosphate salt compounds.

In using my improved compositions for protecting the piping, casings, and other equipment which comes in contact with the corrosive fluids, I have found that excellent results may be obtained by injecting an appropriate quantity, generally not more than 100 p.p.m., of a selected corrosion inhibiting compound into a producing well so that it may mingle with the oil brine mixture and come into contact with the producing equipment. If desired, the inhibiting composition may be introduced directly into the top of the casing and be permitted to flow down into the well, and thence back through the tubing and into related apparatus. I have found that if this procedure is followed, substantial reduction in corrosion throughout the entire production and collecting system may be obtained.

The nature of the inhibiting action of my improved composition is not fully understood, but apparently the phosphate salt compounds of this invention preferentially wet the surface of the metal equipment with oil, thus excluding the brine from contact with the metal. In any event, however, despite the lack of a complete understanding of the mechanics of the inhibiting effect the structures of my invention are extremely and suprisingly effective in protecting oil well and oil field equipment from corrosion, even when used in amounts of 50 p.p.m or less, based on the oil content of the well fluid.

It is to be understood that the improved compositions of my invention are not limited to use alone and may be applied along with other agents commonly introduced in the producing oil wells for breaking emulsions, preventing scale formation, minimizing pitting, etc. It is further evident that my invention is not restricted to the use of improved compositions for inhibiting corrosion in oil wells, but may be employed to perform this function in the presence of corrosive brines derived from other sources.

Having now described my invention, what I claim as new and useful is:

1. The process of inhibiting corrosion of ferrous metals when exposed to contact with corrosive fluids, which include an acidic component selected from the group consisting of carbon dioxide and hydrogen sulphide, which comprises introducing into said fluid in contact with said ferrous metals a corrosion inhibiting amount of the reaction product obtained by neutralizing from one to two mols of alkyl acid phosphate having from 2 to 12 carbon atoms with one mol of a fatty alkyl 1:3 di-amine having a molecular weight of from about 242 to about 320.

2. The process of claim 1, wherein the alkyl acid phosphate is amyl acid phosphate.

3. The process of claim 1, wherein the alkyl acid phosphate is butyl acid phosphate.

4. The process of claim 1, wherein the alkyl acid phosphate is octyl acid phosphate.

5. The process of claim 1, wherein the alkyl acid phosphate is isopropyl acid phosphate.

6. The process of claim 1, wherein the alkyl acid phosphate is lauryl acid phosphate.

7. The process of inhibiting corrosion of ferrous metals when exposed to contact with corrosive fluids, which include an acidic component selected from the group consisting of carbon dioxide and hydrogen sulphide, which comprises introducing into said fluid in contact with said ferrous metals a corrosion inhibiting amount of the reaction product obtained by neutralizing from one to two mols of an alkyl acid phosphate having from one to about ten carbon atoms in the alkyl chain with two mols of a fatty alkyl 1:3 di-amine having a molecular weight of from about 242 to about 320.

8. The method of inhibiting corrosion of ferrous metals when exposed to contact with corrosive fluids, which include an acidic component selected from the group consisting of carbon dioxide and hydrogen sulphide, which comprises introducing into said fluid in contact with said ferrous metals a corrosion inhibiting amount of the reaction product obtained by neutralizing two mols of an alkyl acid phosphate having from one to about ten carbon atoms in the alkyl chain with two mols of a fatty alkyl 1:3 di-amine selected from the group consisting of lauric and coconut oil fatty acids.

References Cited in the file of this patent

UNITED STATES PATENTS

| | | |
|---|---|---|
| 2,285,855 | Downing et al. | June 9, 1942 |
| 2,371,854 | Smith et al. | Mar. 20, 1945 |
| 2,413,852 | Turner | Jan. 7, 1947 |
| 2,728,647 | Vaughn | Dec. 27, 1955 |
| 2,736,658 | Pfohl et al. | Feb. 28, 1956 |
| 2,798,045 | Buck et al. | July 2, 1957 |

OTHER REFERENCES

Haynes: Chemical Trade Names and Commercial Synonyms, second edition, 1955, page 163, D. Van Nostrand C.